July 6, 1937. H. R. TEAR 2,086,371
ASSEMBLING MACHINE
Filed Aug. 21, 1935 5 Sheets-Sheet 1

INVENTOR
Harry R. Tear
BY
ATTORNEY

July 6, 1937.　　　　H. R. TEAR　　　　2,086,371
ASSEMBLING MACHINE
Filed Aug. 21, 1935　　　　5 Sheets-Sheet 2

INVENTOR
Harry R. Tear
BY
ATTORNEY

INVENTOR
Harry R. Tear
BY
ATTORNEY

July 6, 1937.  H. R. TEAR  2,086,371
ASSEMBLING MACHINE
Filed Aug. 21, 1935  5 Sheets-Sheet 4

INVENTOR
Harry R. Tear
BY
ATTORNEY

July 6, 1937.　　　H. R. TEAR　　　2,086,371
ASSEMBLING MACHINE
Filed Aug. 21, 1935　　　5 Sheets-Sheet 5

INVENTOR
Harry R. Tear
BY
ATTORNEY

Patented July 6, 1937

2,086,371

UNITED STATES PATENT OFFICE 2,086,371

ASSEMBLING MACHINE

Harry R. Tear, Evanston, Ill., assignor to The Lubrication Corporation, Chicago, Ill., a corporation of Delaware Application August 21, 1935, Serial No. 37,260

18 Claims. (Cl. 29—88.2)

This invention relates to assembling machines and more particularly to machines for assembling elastic or other packing on pistons or followers. The invention has a peculiar value in connection with the manufacture of containers or cartridges utilized for the direct dispensation of plastic or semi-plastic substances such as lubricants.

Cartridges for lubricants such as those illustrated and described and claimed in the McConkey Patent No. 1,955,339 dated April 17, 1934, employ pistons or followers which serve both as a closure for one end of the cartridge and as a piston against which thrust may be applied to eject the contents of the cartridge or as a follower to prevent air from piercing or cavitating the lubricant as the lubricant is aspirated or sucked from the opposite end of the cartridge. In either case the piston or follower must make a tight seal with the walls of the container or cartridge entirely about the circumference of the piston or follower and throughout the length of the internal wall of the container or cartridge. One very desirable arrangement includes a circumferentially grooved piston or follower (hereafter referred to simply as a piston) with a rubber band disposed in the groove. Of course, many materials other than rubber may be employed and the machine to be described herein is capable of handling packing rings or bands of such other material, although rubber bands may be handled with exceptional facility.

The assembly of a rubber band or other packing on a piston of the type mentioned has been found to be a difficult job as a hand operation and extremely tedious and time consuming. Accordingly, one of the primary objects of the present invention is to provide an assembling machine which will assemble the packings and pistons with the packings properly in place, with a minimum of time and with a minimum expenditure of effort.

Many other objects, the advantages and the various novel features of the invention will be or should become apparent from the following description and claims and from the accompanying drawings in which:

Figure 1:
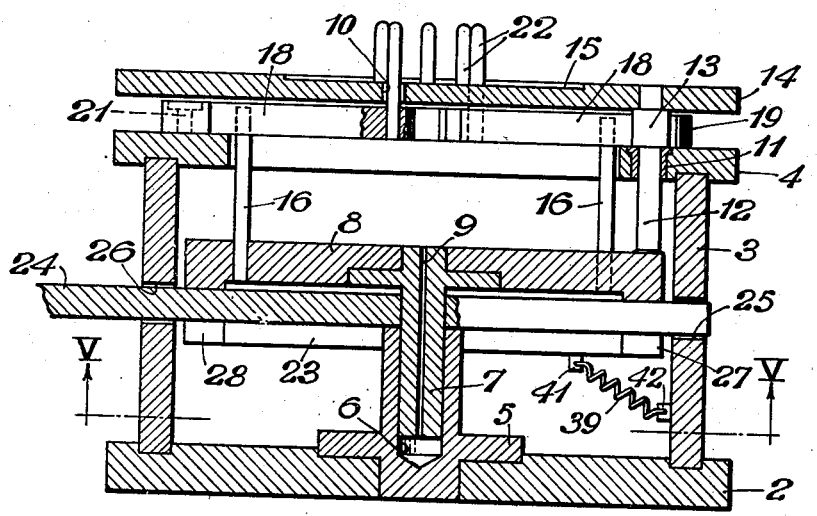
Fig. 1 is a vertical section through one preferred form of machine embodying the invention and showing the parts in an initial or starting position.

The form of the invention illustrated in Figs. 1 to 6 inclusive embodies a support upon which the piston and packing are assembled. This support has a plurality of more or less radially extending slots through which fingers project and may be moved radially inward or outward toward and from one another. The packing band or ring is placed over the fingers which may then be spread to expand or spread the packing band or ring to a diameter sufficient for the piston to be placed therein. After the band has been spread or expanded and the piston has been placed within it, the fingers are moved radially inward toward the piston and are then withdrawn by suitable mechanism, leaving the packing in its proper place upon the piston.

Referring to the form illustrated in Figs. 1 to 6 inclusive, a base plate or the like 2 supports a cylindrical housing member 3 which in turn supports a top plate 4 in the form of an annulus. These parts may be rigidly secured together in any suitable manner. Centrally of the base 2 and secured thereto in any suitable way is a boss 5 bored out as shown at 6 to provide a bearing well in which a vertical shaft 7 secured to an operating disc 8 is mounted for rotation and for vertical movements. An oil passage 9 may be provided in the shaft 7 for the purpose of oiling the bearing surfaces.

The top plate 4 is provided with four substantially equally spaced holes, in each of which a bushing 11 is disposed for the reception of pins 12. Adjacent to their upper ends the pins 12 may be provided with integral collars or enlarged portions 13 which serve to limit downward movement of the pins and which also serve as an abutment for what may be called a stripper plate 14 to which the pins 12 are rigidly secured in any desirable manner. The stripper plate 14 is arranged to be moved upward by the pins 12 through the operation of mechanism to be described. The top of the stripper plate 14 is recessed out to provide a depression 15 and is also slotted to provide any suitable number of slots 10 (eight shown) all of which extend in a generally radial direction, although of slightly arcuate shape.

The operating disc 8 carries a series of pins 16 (there are eight pins 16 in the embodiment illustrated although only two are shown) which are secured to the disc at their lower ends and project vertically upward within the annulus 4 and at their upper ends engage in slots 17 in a series of levers 18 which are pivotally mounted as shown at 19 upon pivot pins 21 secured to the annulus 4. The levers 18 are arranged to swing between the full line and dotted positions illustrated in Fig. 4 (corresponding to the full line positions of Figs. 1 and 2). Secured to the inner ends of the levers 18 are pins 22 which are adapted to project through the slots 10 and to ride from end to end of these slots as the levers 18 move between the positions illustrated.

The operating disc 8 is provided with a depending flange 23 which on diametrically opposite sides is cut away for the passage of a lever arm 24 which is journalled upon the shank 7 and rides in suitable slots 25 and 26 cut through the cylindrical housing member 3. The diametrically opposite cut away portions of the flange 23 are so cut away as to provide a perpendicular shoulder 27 and a slanting shoulder 28 on the other side of each cut away portion, the straight and slanting shoulders lying in the same sense that is, the straight and slanting shoulders alternating with one another about the periphery of the flange 23. The straight shoulders are adapted to be engaged by the lever to form an abutment therefor so that the lever will rotate the operating disc 8 when it is moved in one direction, whereas the slanting shoulders 28 cause the operating disc to ride up on the lever when the lever is moved in the opposite direction. Secured to and projecting downwardly from the flange 23 on the operating disc is a pin or latch member 29 which, when the operating disc is moved in one direction, rides against, depresses and engages behind another latch member or pawl 31 which is pivotally mounted on a pivot pin 32 in a recess 33 formed in the wall of the housing member 3. A leaf spring 34 secured at one end as by rivets 35 to the housing member 3 serves normally to urge the pawl 31 inwardly of the housing but a lug 36 on the pawl is adapted to engage the housing to prevent the pawl from being displaced too far inwardly thereof.

Figure 2:
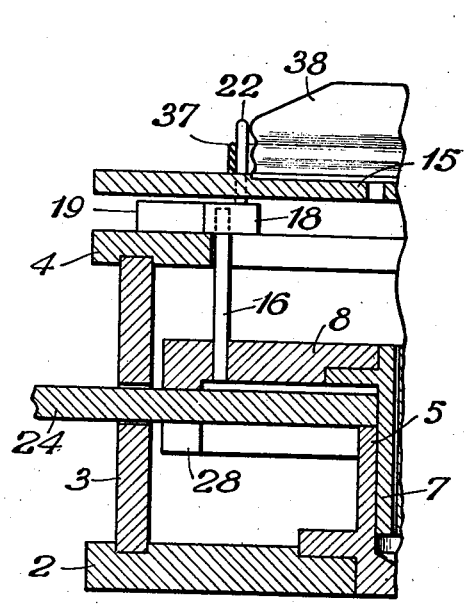
Fig. 2 is a partial vertical section of the machine of Fig. 1 showing the parts in a position where the packing and piston are about to be assembled.
Figure 3:
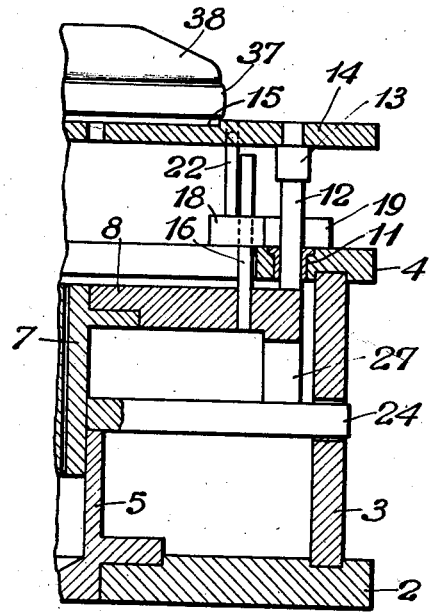
Fig. 3 is a partial vertical section of the machine of Fig. 1 showing the parts in the position they assume immediately after assembling the packing and piston.
Figure 4:
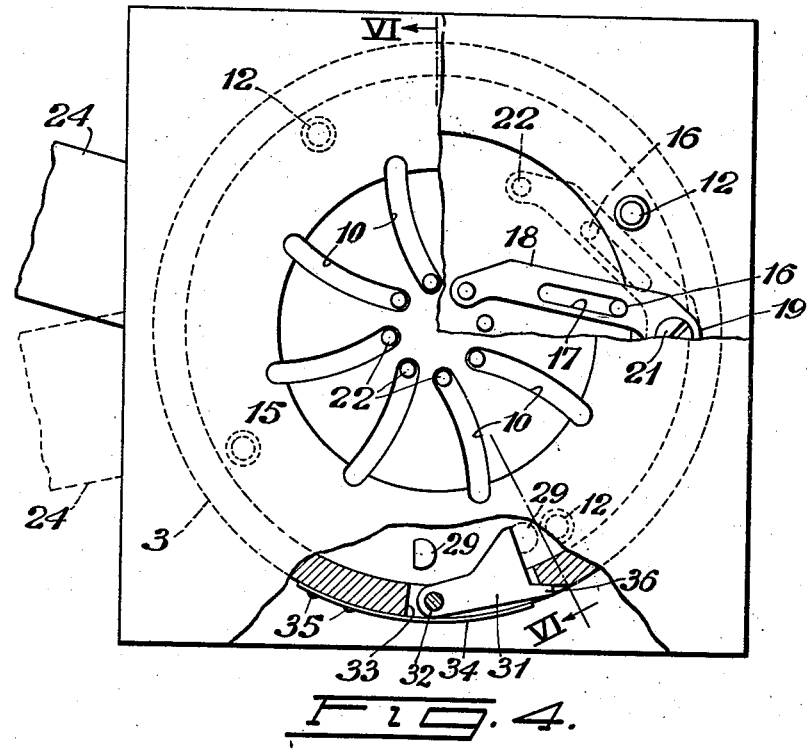
Fig. 4 is a top plan view of the machine of Fig. 1 with parts broken away and parts in section.
Figure 5:
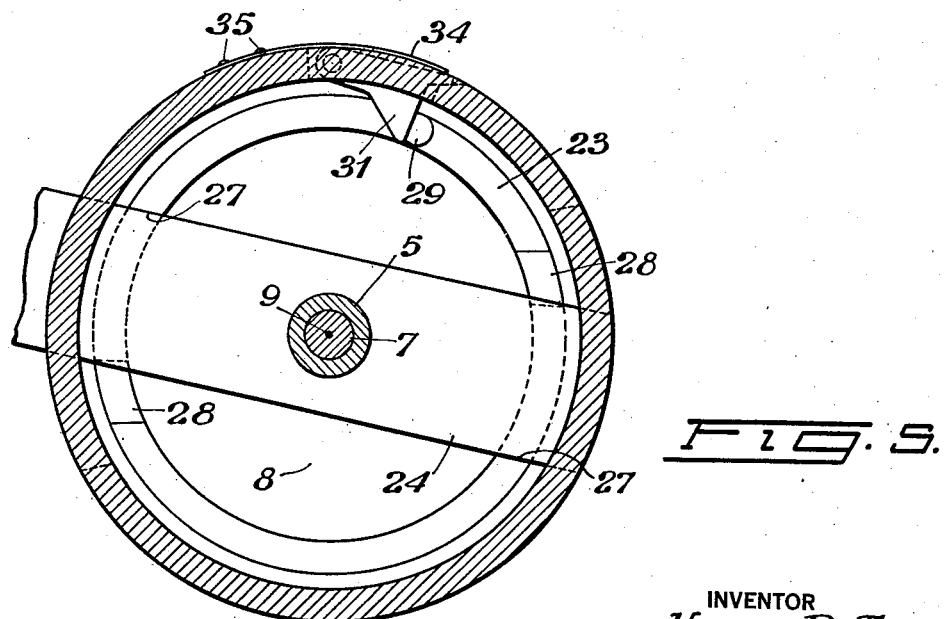
Fig. 5 is a section taken along the line V—V of Fig. 1 looking in the direction of the arrows.
Figure 6:
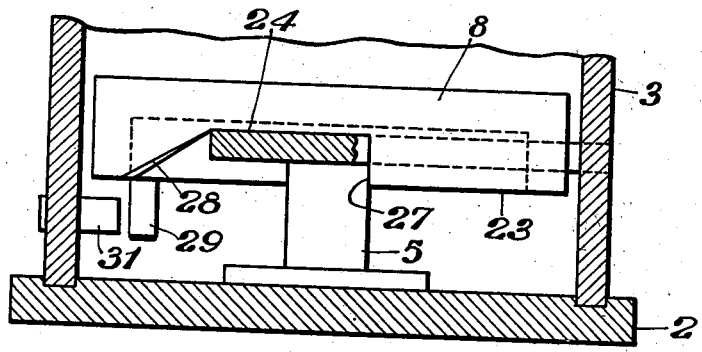
Fig. 6 is a section taken along the line VI—VI of Fig. 4 looking in the direction of the arrows.
Figure 14:
Fig. 14 is a view of the piston of Fig. 12 (partly in section) showing the packing assembled thereon.

The operation of this machine is as follows: A band or ring of rubber or other packing to be assembled upon a piston in the position shown in Fig. 14 is placed over the pins 22 which at this stage are in the position illustrated in Fig. 1. A counterclockwise movement of the lever 24 (viewing Fig. 4) swings the operating disc 8 in the same direction, thereby moving the pins 16 in the same direction. Each pin 16 will move from the full line position to the dotted line position shown in the upper right hand cut away portion of Fig. 4 and in so doing rides in its slot 17 in its respective lever 18 thereby swinging the pins 22 to the outer ends of the slots 10. This movement of the pins 22 will stretch or spread the packing ring 37 to a diameter sufficiently great to permit insertion of a piston 38 between the fingers 22 and into the recess 15. During this operation the lever 24 is moved from its full line to its dotted line position of Fig. 4 and the latch pin 29 likewise moves from its full line to its dotted line position (viewing Fig. 4) at which point the latch pin engages behind the pawl 31 and locks in position. After the piston 38 is in position as illustrated in Fig. 2, the lever 24 is moved in a clockwise direction (Fig. 4) to its other extreme position. Owing to the engagement of the latch pin 29 behind the pawl 31, a spring 39 secured between an abutment 41 on the flange 23 and an abutment 42 secured to the frame member 3, cannot return the operating disc 8 to its initial position until the pin 29 has been released from behind the pawl.

As the lever 24 is rotated clockwise, it engages the slanting shoulders 28 which have a cam action and cause the operating disc 8 to rise vertically with its shaft 7. The upward movement of the disc 8 forces the pins 12 to rise, carrying the stripper plate 14 upwardly from the position shown in Fig. 2 to the position shown in Fig. 3, and, since the piston 38 and the packing band or ring 37 are carried by the stripper plate, they move upwardly relative to the pins 22 until the plate assumes approximately the position shown in Fig. 3 at which time the pins 22 are completely withdrawn from the packing band, and the latter is dropped in place in the groove in the piston provided to receive it. Just as soon as the operating disc 8 is raised sufficiently for the latch pin 29 to clear the top of the pawl 31, the spring 39 returns the disc, the pins 16 and the levers 18 together with their pins 22 to the initial or starting position.

Figure 7:
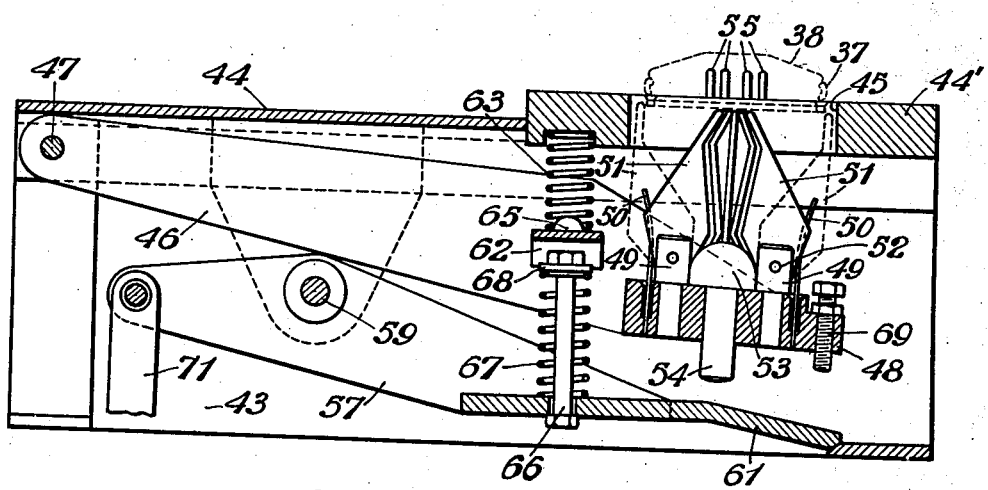
Fig. 7 is a vertical sectional view of a modified form of the invention.
Figure 9:
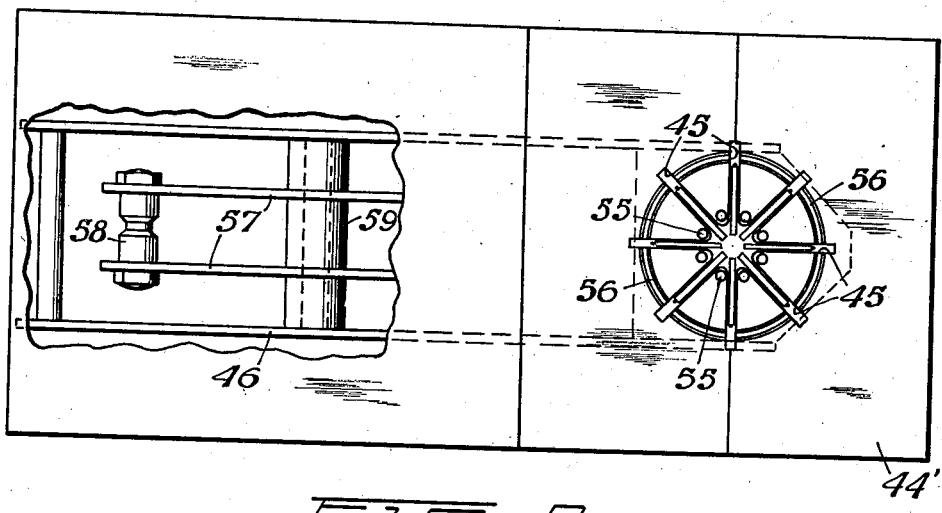
Fig. 9 is a top plan view of the machine of Fig. 7 with parts broken away.
Figure 8:
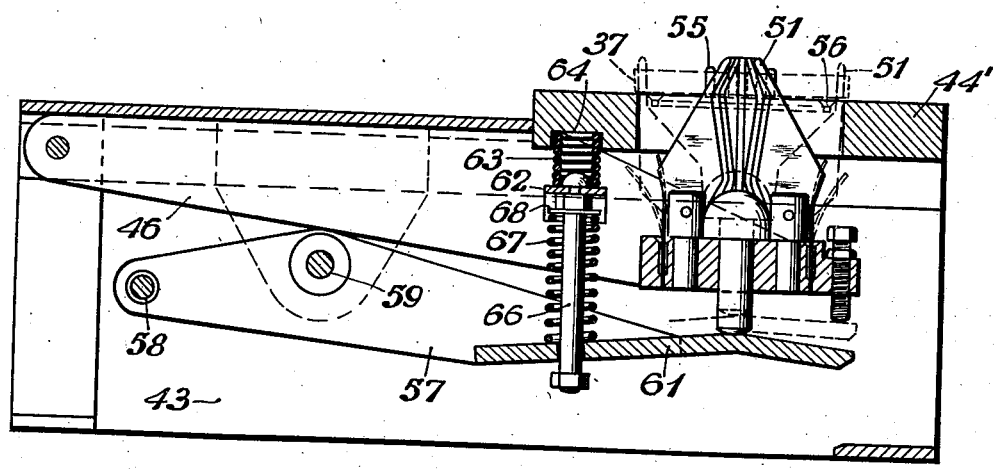
Fig. 8 is a section similar to that of Fig. 7 showing the parts in different positions.

Figs. 7 to 9 inclusive illustrate another embodiment of the invention. A frame generally indicated at 43 has a top plate 44 to which a stripper plate 44' is secured and the stripper plate 44' is slotted with a plurality of radially extending slots 45. A lever 46 comprising a pair of arms and pivoted at 47 on the frame 43, carries a block 48 in which there are a plurality of studs 49 to each of which a finger 51 is secured on a pivot 52 for swinging movements. Springs 50 secured in the block 48 normally urge the fingers 51 toward their position of Fig. 7.

A cam member 53 of mushroom shape is arranged to engage and spread the fingers 51 and for this purpose it is provided with a stem 54 mounted for vertical sliding movements in the block 48, the stem having its lower end arranged for engagement with a portion of the plate 61. When the cam 53 is moved upward relative to the block 48, it engages with and spreads the fingers 51 from their clustered full line position in Fig. 7 to their spread dotted line position in Fig. 8, the fingers and the block, meanwhile, having been raised together to their upper position as shown in Fig. 8. The stripper plate 44' carries a series of fixed posts 55 at the inner ends of the triangular segments defined by the slots 45 while the bases of the segments are cut by arcuate grooves 56 in which the bottom edge of a piston is adapted to rest.

A yoke-like lever comprising a pair of arms 57 joined at one end by a pin 58, pivoted on a fulcrum pin 59 and joined together at their other ends by a plate 61, is arranged to raise and to spread the fingers 51. Mounted between and secured to the arms of lever 46 is a bracket 62 which provides an abutment for the lower end of a relatively weak spring 63, the upper end of which is lodged in a recess 64 in the plate 44', a rivet or the like 65 serving to center the lower end of the spring on the bracket 62. This bracket also serves as an abutment for the head of a bolt 66 which is floatingly mounted through an aperture in the plate 61 and surrounded by a relatively strong spring 67 which finds abutment at one end against the plate 61 and at its other end against a washer 68 lodged against the bolt head. In normal position the parts are disposed as shown in Fig. 7 in full lines with the head of the bolt 66 spaced below the bracket 62 so that the bolt may move upward a predetermined distance prior to its engagement with the bracket and prior to compression of the spring 67. An adjustment screw 69 may be disposed through the bracket 48 for purposes to be described.

The operation of the machine of Figs. 7 to 9 is somewhat similar to the operation of the machine first described. A rubber band or other packing ring or the like being placed around the fixed posts 55 and the lever 57 being connected through a link 71 with a foot treadle or with any mechanism that may be operated in timed relationship to the placement of the band 37, the piston 38 and the removal of the assembled article, the machine may then be started into operation. Downward movement of the link 71 moves the lever 57 about its fulcrum 59 causing the plate 61 to be moved upwardly toward the stem 54 of the cam 53. During the first part of this movement the bolt 66 closes the gap between its head and the bracket 62 and the plate 61 comes in contact with the stem 54. From this point on the spring 63 is compressed as the lever 46 moves upwardly carrying the fingers 51 up through the slots 45 to positions within the band or packing and between the pins 55 as illustrated in Fig. 8.

When the compression of the spring 63 reaches a predetermined point, the spring 67 begins to compress and the stem 54 and cam head 53 are moved upward relative to the block 48, the cam causing the fingers 51 to spread to their outer limit as shown in dotted lines in Fig. 8. The spreading of the fingers is limited by the adjustable screw abutment 69 which contacts at an appropriate moment with the plate 61. At this point the packing band is stretched or spread to a diameter sufficient to permit the piston 38 to be dropped into the slot 56 whereupon the link 71 is released to permit the levers 46 and 57 to return to their normal positions under the influence of gravity and the springs 63 and 67. The dropping of lever 57 withdraws the cam head 53 from between the fingers so that the fingers move in against the sides of the piston and the dropping of the block 48 with the lever 56 withdraws the fingers from between the band and the piston and allows the band to settle into its groove on the piston. The fingers 51 instantaneously assume the position shown in dotted lines in Fig. 7 before being returned to their full line position of Fig. 7 under the influence of springs 50.

Figure 11:
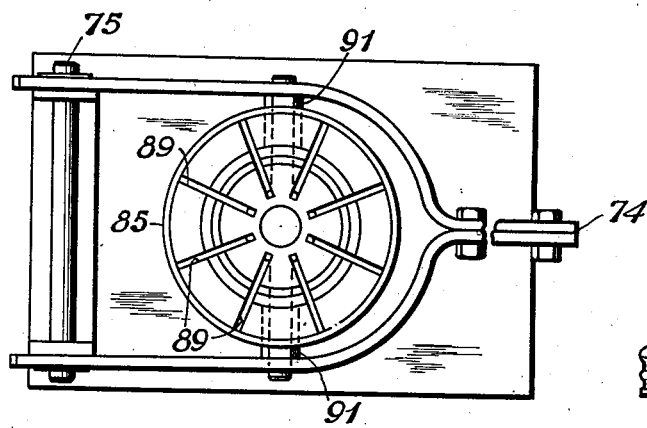
Fig. 11 is a top plan view of the machine of Fig. 10.
Figure 12:
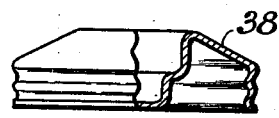
Fig. 12 is an elevation (partly in section) of one form of piston adapted to have packing placed upon it by anyone of the forms of the invention illustrated.
Figure 13:
Fig. 13 is a perspective view of a band or ring packing to be assembled upon the piston of Fig. 12.
Figure 10:
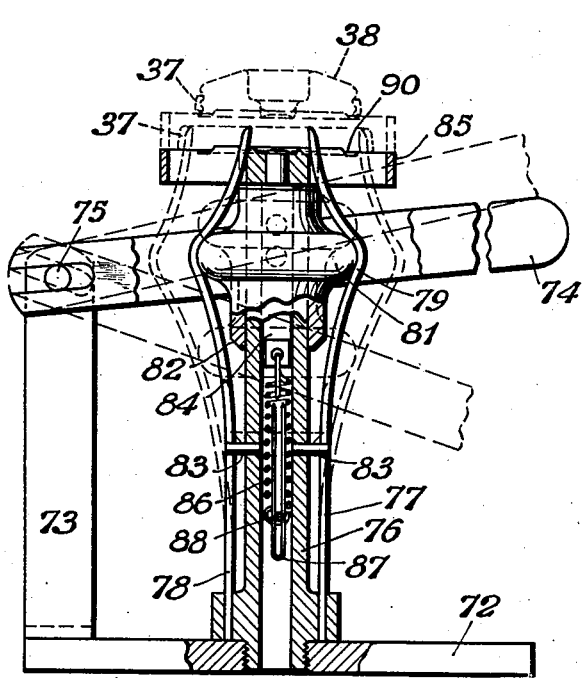
Fig. 10 is a vertical sectional view of still another embodiment of the invention.

The embodiment of the invention illustrated in Figs. 10 and 11 includes a base 72 upon which a yoke-shaped standard 73 is fixedly mounted to serve as a fulcrum for a yoke-shaped lever 74, the arms of which are pivotally mounted upon a pin 75 passing through the top ends of the yoke arms 73. The lever 74 is shown in its normal inoperative position in full lines and in its upper and lower extreme positions in dotted lines in Fig. 10. Also mounted upon the base 72 is a hollow post 76 carrying a plurality of spring fingers 77 arranged in circular array about the base of the post with their bottom ends rigidly secured thereto while the top ends are free as shown.

Each of the spring fingers 77 is bowed at 79 to fit the outer contour of a circular cam boss 81 integral with a sleeve 82 slidably mounted on the post 76. Each of the spring fingers 77 is given enough initial tension to hold it fairly tightly against the cam 81 and each has a pin or dowel 83 secured to it. The dowels 83 are slidably mounted in holes drilled in the post 76 and serve as guides for the spring fingers during the movements of their upper end portions toward and from the full line positions indicated in Fig. 10. These spring fingers are adapted to be moved outwardly by the cam 81 to a spread position indicated in dotted lines in Fig. 10.

Slidably mounted in the hollow interior of the post 76 is a rod 84 to the upper end of which a slotted disc 85 is fixedly secured and the bottom end of which is anchored through a spring 86 and a hair pin spline to a pin 88 which extends transversely through the post 76. The spring and spline permit limited vertical movements of the slotted disc 85 and the spring returns the parts to their position shown in full lines. The upper ends of the spring fingers 77 are adapted to ride in the slots 89 in the disc 85 and to stretch or spread a rubber or other packing ring that may be placed thereabout while a groove 90 formed in the top of the disc 85 is adapted to receive the bottom edge of the piston 38. The yoke arms of the lever 74 are connected to the cam 81 through trunnions 91.

In operating the machine of Figs. 10 and 11, a rubber band or other packing ring is placed about the upper edge of the spring fingers 77 and on top of the disc or stripper plate 85. The lever 74 is moved from its full line to its lower dotted line position which causes the cam 81 to spread the fingers to the position in which they are shown in dotted line whereupon the piston 38 is deposited in the groove 90. At this time, the lever is moved upward to the upper dotted line position which causes the cam 81 to move to its upper dotted line position and, as the top of the cam sleeve 82 engages the underside of the stripper plate or disc 85, the stripper plate is moved upwardly relative to the spring fingers 77, thereby stripping the packing band or ring from the finger ends and causing the band to be deposited in the groove on the piston.

Each of the machines illustrated is adapted for incorporation in principal features at least in an automatic mechanism arranged to operate the machine in timed relation to the deposit of the packing band, the deposit of the piston, and the removal of the assembly, as will be appreciated. Furthermore, many other variations and changes may be made without departing from the spirit of the invention or the scope of the appended claims.

I claim:

1. An assembling machine comprising, a stripper plate, a plurality of movable fingers extending through the stripper plate, an operating lever associated with said fingers to spread them, and means operable by movement of said lever in one direction for moving the stripper plate and fingers relatively longitudinally and by movement of the lever in the other direction to spread the fingers.

2. An assembling machine comprising a frame, a stripper plate mounted on said frame, a plurality of movable fingers mounted on said frame and extending through the stripper plate, said fingers and stripper plate being movable relatively longitudinally, an operating lever, means connecting the operating lever to the fingers to spread the fingers, and means operable by movement of said lever in one direction to move the fingers and stripper plate relatively longitudinally and by movement of the lever in the other direction to spread the fingers, one of said means including a cam member.

3. An assembling machine comprising, a frame, a stripper plate mounted for vertical movement on said frame, a plurality of fingers mounted on said frame for pivotal movement and extending through said stripper plate, and operating means connected to said fingers and said plate for spreading the fingers and moving the plate vertically, one of said connections including a cam member.

4. An assembling machine comprising, a frame, a stripper plate mounted for vertical movement on said frame, a plurality of fingers mounted on said frame for pivotal movement and extending through said stripper plate, an operating disc rotatably mounted on said frame and connected to the fingers to spread them, a lever for rotating said disc, and means associated with said lever for moving the stripper plate vertically.

5. An assembling machine comprising, a frame, a stripper plate mounted for vertical movement on said frame, a plurality of fingers mounted on said frame for pivotal movement and extending through said stripper plate, an operating disc rotatably mounted on said frame and connected to the fingers to spread them, a lever for rotating said disc, cooperating cam surfaces on said lever and said disc, to move the disc vertically and connections between the disc and the stripper plate whereby the stripper plate will be moved vertically by the disc.

6. An assembling machine comprising, a frame, a stripper plate mounted on said frame for relative vertical movement but held against relative rotational movement, said stripper plate having a plurality of substantially radial slots therein, a plurality of fingers pivotally mounted on said frame and extending through said slots, an operating disc mounted on said frame for rotary and axial movement, connections between said disc and said fingers whereby the fingers will be moved outwardly in the slots when the disc is rotated in one direction, a pivoted lever for rotating said disc, a connection between the lever and the disc operative to turn the disc with the lever when the lever is turned in one direction and to move the disc axially when the lever is turned in the other direction relative to the disc, and a connection between the disc and the stripper plate to move the stripper plate vertically in response to axial movements of the disc.

7. An assembling machine comprising, a frame, a stripper plate mounted on said frame for relative vertical movement but held against relative rotational movement, said stripper plate having a plurality of substantially radial slots therein, a plurality of fingers pivotally mounted on said frame and extending through said slots, an operating disc mounted on said frame for rotary movement, connections between said disc and said fingers whereby the fingers will be moved outwardly in the slots when the disc is rotated in one direction, latch means for holding said disc in a position with said fingers moved out, a pivoted lever for rotating said disc, a connection between the lever and the disc operative to turn the disc with the lever when the lever is turned in one direction and to move the disc axially when the lever is turned in the other direction relative to the disc, and a connection between the disc and the stripper plate to move the stripper plate vertically in response to axial movements of the disc, said latch means being releaseable by axial movement of the disc.

8. In an assembling machine having a vertically movable stripper plate and spreadable fingers extending therethrough, operating mechanism comprising a disc mounted for rotary and axial movements, means connecting the disc to said fingers to spread the fingers when the disc is rotated, means connecting the disc to the stripper plate to move the stripper plate axially when the disc is moved axially, means urging said disc toward one radial position in which the fingers are retracted, latch means for holding said disc in another radial position in which the fingers are spread, and operating means for moving said disc both rotatively and axially, said latch means being releaseable by axial movement of the disc.

9. In an assembling machine having a vertically movable stripper plate and spreadable fingers extending therethrough, operating mechanism comprising a disc mounted for rotary and axial movements, means connecting the disc to said fingers to spread the fingers when the disc is rotated, means connecting the disc to the stripper plate to move the stripper plate axially when the disc is moved axially, means urging said disc toward one radial position in which the fingers are retracted, latch means for holding said disc in another radial position in which the fingers are spread, a pivoted operating lever, and a connection between said operating lever and the disc effective in one direction to turn the disc by the lever, said connection including a cam surface effective upon relative movement of the lever relative to the disc in the other direction to move the disc axially, said latch means being released by axial movement of the disc.

10. An assembling machine comprising, a frame, a stripper plate mounted on the frame for vertical movement, a plurality of fingers extending through said plate, and an operating lever pivoted on the frame and so connected to the fingers and the stripper plate that movement of the operating lever in one direction spreads the fingers and movement thereof in the opposite direction moves the plate vertically.

11. An assembling machine comprising a frame, a stripper plate mounted for longitudinal movement on said frame, a plurality of fingers arranged generally parallel to the path of movement of the stripper plate and extending through the stripper plate, a cam member mounted between said fingers, and a lever movable in one direction to operate said cam member to spread the fingers and in the other direction to move the cam into engagement with the stripper plate to move the stripper plate.

12. An assembling machine comprising, a stripper plate mounted for longitudinal movement, a plurality of fingers arranged generally parallel to the path of movement of the stripper plate and extending through the stripper plate, a cam member mounted between said fingers for longitudinal movement along a path coaxial with the path of movement of the stripper plate, and means to move said cam member in one direction to spread the fingers and in the other direction to move the stripper plate.

13. An assembling machine comprising, a stripper plate, a block mounted for movement toward and away from said stripper plate, a plurality of fingers pivotally mounted on said block and adapted to extend through said plate, a cam member carried by said block for spreading the fingers, and a lever engageable with said cam member to move the block toward the stripper plate whereby the fingers will extend through the stripper plate and then to move said cam relative to the block to spread the fingers.

14. An assembling machine for assembling elastic bands on pistons having band-receiving grooves therein comprising a plurality of fingers to receive an elastic band, means for spreading the fingers to stretch the band, a stripper plate through which the fingers extend and adapted to support an annular piston, a circular depression in the stripper plate to receive the edge of the piston whereby the groove in the piston lies substantially flush with the surface of the stripper plate, and means for moving the stripper plate relative to the fingers whereby the band will be stripped from the fingers and deposited in said groove.

15. An assembling machine comprising, a frame including a vertical post, a plurality of fingers in annular array around said post, a stripper plate carried by said post and having a series of radial slots therein through which said fingers respectively extend, and a cam slidably mounted on said post and movable in one direction to spread the fingers and in the other direction to move the stripper plate and fingers relatively longitudinally.

16. An assembling machine comprising, a frame including a vertical post, a plurality of fingers rigidly secured to the lower end of said post in annular array, a stripper plate carried by the upper end of the post for axial movement relatively thereto, said stripper plate having a series of radial slots, through which said fingers extend, a cam slidable on said post and lying between the post and the fingers, and means for sliding the cam on the post to spread the fingers and to move the stripper plate.

17. An assembling machine comprising, a stripper plate having a series of radial slots therein, a block pivotally carrying a plurality of fingers adapted to extend through said slots respectively, means pivotally connecting the plate and block whereby they may be moved relatively toward and away from each other, means for urging the plate and block relatively toward each other, and means operated by said last named means independently of the block for spreading said fingers.

18. An assembling machine comprising, a stripper plate having a series of radial slots therein, a block pivotally carrying a plurality of fingers adapted to extend through said slots respectively, means pivotally connecting the plate and block whereby they may be moved relatively toward and away from each other, means carried by and movable independently of the block for spreading the fingers, and a single operating member for moving the plate and block relatively toward each other whereby the fingers will extend through the slots and for then operating said last named means to spread the fingers.

HARRY R. TEAR.